| United States Patent [19] | [11] 3,996,189 |
| Travnicek | [45] Dec. 7, 1976 |

[54] OPTICALLY CLEAR FILLED SILICONE ELASTOMERS

[75] Inventor: Edward A. Travnicek, Southbridge, Mass.

[73] Assignee: American Optical Corporation, Southbridge, Mass.

[22] Filed: Mar. 17, 1976

[21] Appl. No.: 666,591

Related U.S. Application Data

[63] Continuation-in-part of Ser. No. 572,788, April 29, 1975.

[52] U.S. Cl. .................. 260/37 SB; 260/46.5 UA; 260/825

[51] Int. Cl.² ........................................ C08L 83/04

[58] Field of Search ............... 260/37 SB, 46.5 UA, 260/825

[56] References Cited

UNITED STATES PATENTS

| 3,197,433 | 7/1965 | Lamoreaux | 260/46.5 P |
| 3,491,165 | 1/1970 | Seyfried et al. | 260/825 |
| 3,808,178 | 4/1974 | Gaylord | 260/46.5 UA X |

Primary Examiner—Lewis T. Jacobs
Attorney, Agent, or Firm—Albert H. Graddis; Frank S. Chow

[57] ABSTRACT

Reinforced silicone elastomers, having improved tensile strength and particularly tear strength, include at least copolymers of aryl siloxanes and alkyl siloxanes, in a ratio of aryl to alkyl substituents providing 6 to 16 mole percent phenyl chosen to provide a refractive index matched to the index of refraction of a silica filler, form optically clear material useful for soft contact lenses. Preferably two copolymers are used and each has methyl groups with 6 to 16 mole percent phenyl groups. One of the two copolymers contains terminal vinyl groups and the other copolymer contains terminal $(R)_2HSi-O-$ groups. Platinum materials are used to catalyze the vulcanization of the copolymer mix. These elastomers are useful for a variety of optical products, e.g., contact lenses, intraocular implants and the like.

6 Claims, No Drawings

OPTICALLY CLEAR FILLED SILICONE ELASTOMERS

This application is a continuation-in-part of my co-pending application, Ser. No. 572,788 filed Apr. 29, 1975.

FIELD OF THE INVENTION

This invention relates to optically clear, reinforced, inter-polymers of aryl and alkyl siloxanes, forming silicone elastomeric, soft plastic contact lenses. More particularly, this invention relates to silica filled vulcanizates of two or more copolymers of dimethyl siloxane with at least one of diphenyl siloxane or methylphenyl siloxane.

BACKGROUND OF THE INVENTION

Many silicone elastomers, when unfilled, generally have excellent optical clarity and are usually water-white in color. The tensile strength, and especially the tear strength, of such elastomers is poor, however. By filling the elastomers with fine particulate solids, the silicone resin or gum stock will produce, when vulcanized and cured, an elastomer with much improved strength. Fillers used with silicone elastomers have been the usual fillers for plastics, but the fillers are limited when optical clarity of the elastomer is essential. Commonly used dimethyl siloxane, with a vulcanizing agent, produces a silicone elastomer, but for satisfactory use it needs a filler for strength. One filler used for silicone elastomers is finely divided silica, known as smoke or fume silica. This filler when added to dimethyl siloxane elastomer, or gum stock and then vulcanized, produces a translucent elastomer, generally considered useless for objects needing optical clarity, such as lenses. This is primarily due to the mismatch of the indices of refraction of fume silica and dimethyl siloxane.

In U.S. Pat. No. 3,341,490 there is described a blend of vinyl-type siloxane units which may be filled with a silica filler forming, after vulcanizing and curing, products which are useful in the manufacture of articles having optical clarity.

THE INVENTION

The present invention provides, in one form, for making copolymers of diphenyl siloxane and dimethyl siloxane, in about a ratio of 12 mole percent of phenyl to methyl groups in the copolymer. This invention includes a reinforced silicone-type, soft plastic contact lens containing about 6% to about 16% mole of aryl groups comprising a copolymer of:
  a. an aryl siloxane,
  b. an alkyl siloxane, and
  c. a silica filler,
said lens being characterized by the silicone copolymer having essentially the same refractive index as the silica filler, forming a transparent, optically clear lens. Minor variations in the compositions will have only a slight effect upon optical clarity. Since mixtures of highly arylated silicone oils or gums are generally not miscible with the alkyl siloxanes, copolymers must be used. Mixtures of two or more silicones containing nearly the same aryl-alkyl (typically phenyl-methyl) ratio can be mixed to obtain the precise refractive indices to match the silica filler. The optical dispersions will not normally match perfectly, but the matches can be made sufficiently close to avoid significant interference with optical clarity of the lenses.

OBJECTS OF THE INVENTION

One of the objects of the present invention is to produce a silicone elastomer of aryl siloxane and alkyl siloxane containing an aryl-alkyl group ratio providing a refractive index which substantially matches the index of refraction of a filler to be used with the elastomer.

Another object of the invention is to provide copolymers of diphenyl siloxane and dimethyl siloxane containing about twelve mole percent diphenyl groups to the methyl groups having a refractive index substantially matching that of a fume silica filler.

Another object of the invention is to provide optically clear silica-filled silicone elastomers formed of aryl and alkyl siloxanes.

Still another object of the present invention is to provide a silica-filled contact lens having an elastomer of two polymers, one having terminal vinyl groups and the other having terminal $(R)_2HSi-O-$ groups, where R is methyl or ethyl. In other respects the polymers are similar with the noted terminal groups being present only in their respective polymer.

These and other objects of the invention may be ascertained by referring to the following description and appended claims which set forth the general invention.

SPECIFIC INVENTION

Generally, a copolymer of an aryl siloxane and an alkyl siloxane containing about 12 mole percent of the aryl groups will have a refractive index which will substantially match that of a fume silica filler, making the elastomeric product transparent or substantially transparent. In one specific case, a copolymer of diphenyl siloxane and dimethyl siloxane containing about 12 mole percent of the diphenyl groups with a balance of dimethyl groups produces a product which will be essentially transparent with a fume silica filler. Also, a copolymer of phenyl-methyl siloxane (about 24 mole percent) with dimethyl siloxane produces a copolymer (containing about the same proportion of phenyl and methyl groups) product having a refractive index which will match that of the fume silica filler. Other co- or ter-polymers, containing the same proportion of phenyl and methyl groups will produce products which are transparent with the fume silica fillers. Minor variations in the composition of the polymers have a slight effect upon optical clarity.

Preferably, the contact lens of this invention includes:
  A. A polymer of
    1. dimethyl siloxane,
    2. diphenyl siloxane or phenyl-methyl siloxane or both, and
    3. vinyl siloxane,
    which contains a small amount of a platinum catalyst in solution;
  B. A polymer of
    1. dimethyl siloxane,
    2. diphenyl siloxane or phenyl-methyl siloxane or both, and
    3. a siloxane having $(R)_2HSi-O-$ groups, or $-O-SiHR-O-$ groups or both, wherein R is methyl or ethyl, and preferably methyl; and
  C. 5 to 20% fume silica.

This preferred embodiment is substantially free of Si atoms which do not have an organo group bonded thereto.

The A and B polymers must each have 6 to 16 mole percent phenyl groups and each contain no Part 3 of the other. Since it is difficult to find a commercially available polymer having the proper percentage of phenyl groups to closely match the index of refraction of the filler, as well as having the other required properties, the index of refraction in the elastomer can be closely matched by selecting a mixture of polymers so that their blend has an index of refraction the same as the index of refraction of the filler. As noted above, care must be taken to avoid mixing polymers having widely differing amounts of phenyl groups. I have found that within the range of 6 to 16 mole percent phenyl the effect on transparency, due to unequal amounts of the phenyl groups, is not significant.

The selection of a catalyst is within the skill of the art. The preferred catalysts are organo platinum compounds such as those disclosed in U.S. Pat. Nos. 2,823,218 and 3,159,601. Many commercial silicone polymers useful in formulating the vulcanizate of the present invention contain catalytic amounts of such organo platinum compounds. Catalytic materials such as organotin compounds and amines should generally be avoided due to their known toxicity. Although not essential, it is preferable that the resulting vulcanized product be extracted to remove impurities, e.g., unreacted starting materials. Suitable solvents are, for example, aliphatic, aromatic or chlorinated hydrocarbons. These include, for example, hexane, toluene, methylene chloride, chloroform, and carbon tetrachloride.

To further illustrate the practice of this invention, the following examples are included:

EXAMPLE 1

Dow Corning silicone oils, known as DC 550 and DC 560, were found to be miscible in all proportions. The silicone oil DC 560 has an index of refraction of $n_D^{20} = 1.436$, while silicone oil DC 550 has an index of refraction of $n_D^{20} = 1.4935$. Either of these oils singly, when mixed with about six percent by weight of fume silica, produced a suspension that was hazy and not optically clear. Mixtures of DC 560 and DC 550 were made in various mixtures and each was mixed with about six percent by weight of treated fume silica. It was found that fume silica treated with trimethyl silyl was much easier to disperse than the untreated fume silica. A mixture containing about 35 parts by volume of DC 550 and 65 parts by volume of DC 560, mixed with about six percent by weight of treated fume silica, gave excellent optical clarity even when backlighted with a small spotlight. This mixture had a calculated refractive index of 1.455. Mixtures varying ±5% volume of DC 550 oil had almost as good optical clarity. These mixtures varied in index of refraction by a calculated ±0.0025. A variation in the index refraction of ±0.004 for the mixtures had a barely perceptible haze when sidelighted.

EXAMPLE 2

A gum containing only dimethyl siloxane with a trace (0.1 mole percent) of vinyl methyl siloxane when mixed with fume silica produced an unacceptable hazy material. The refractive index was $n_D^{23} = 1.4045$ for this material. Another siloxane gum containing seven mole percent diphenyl siloxane, 0.1% vinyl methyl siloxane, and the balance dimethyl siloxane terpolymer, had a refractive index of $n_D^{23} = 1.4320$. When mixed with treated fume silica, this produced a material with a much improved clarity. However, this was not as good as that of the oil mixture cited in Example 1 with a refractive index of $n_D^{20} = 1.455$. In each case the gum with the treated silica reinforcing filler was mixed with about 0.5 to 2.5 parts of an organic peroxide vulcanizing agent (these being commercially known) and the copolymer or terpolymer blends of the process were vulcanized by conventional techniques. For example, the blends might be vulcanized by irradiation or with a known peroxide vulcanizing agent, employing the usual methods.

EXAMPLE 3

A two-part silicone potting resin (General Electric RTV 615) was mixed with fume silica filler so that the final mixture contained 100 parts of Part A, 10 parts of Part B and 11 parts of fume silica filler (all parts by weight). Part A of this resin is a copolymer of dimethyl siloxane and about 0.3 mole percent of a vinyl siloxane. It also contains a catalytic amount of an organo platinum catalyst from a group known to the art. Part B of the above resin is a copolymer whose major component is dimethyl siloxane and about 1 to 2% of —O—SiH(CH$_3$)$_2$ units. When the part A and B components are mixed immediately prior to use, the platinum compound catalyzes a reaction between the vinyl and ⟩SiH groups to form new chemical bonds and ultimately a cross-linked elastomeric mass.

The silica-filled mixture as described above was used to make contact lenses. It was found to have adequate strength but inadequate optical clarity, even when in sections only 0.10 millimeters thick.

Dr. David Miller, in the Contact Lens Journal, April 1972, Page 38, described the use of this resin mixture for contact lenses.

EXAMPLE 4

A two-part silicone potting resin from General Electric known as RTV 655 was mixed with fume silica filler so that the final mixture contained 100 parts of Part A, 10 parts of Part B and 11 parts of fume silica filler (all parts by weight). Part A of this resin is a terpolymer of about 0.3 mole % of a vinyl siloxane, about 6 mole percent diphenyl siloxane and the remainder dimethyl siloxane. Part A also contains a catalytic amount of an organo platinum catalyst from a group known to the art. Part B of the above resin is a copolymer that contains about 1 to 2 mole percent —O—SiH(CH$_3$)$_2$ units, about 6 mole percent diphenyl siloxane and the remainder dimethyl siloxane units. When the part A and B components are mixed immediately prior to use, the platinum compound catalyzes a reaction between the vinyl and ⟩SiH groups to form new chemical bonds and ultimately a cross-linked elastomeric mass. The filler may be mixed with Parts A and B in any order. It is usually most convenient to mix the filler with the A component first and then to mix that mixture with the B component. This mixture was used to make contact lenses. It was found to have adequate strength and to have sufficient optical clarity to be useful for contact lenses. The haze of this filled material was barely measurable in sections less than 1mm thick and much less than that of the filled RTV 615 of Example 3.

Although the phenyl content of RTV 655 was selected to give optimum flexibility at very low temperatures for other applications, it has sufficient phenyl content to give optical clarity when used with fume silica filler to be comparable to the optical clarity of hydrogel soft contact lenses. Another advantage of RTV 655 is its commercial availability.

EXAMPLE 5

Several silicone oils of varying phenyl-methyl contents were mixed in pairs in equal proportion. It was found that several pairs of oils were not miscible. The least miscible pairs of oils were those with the greatest mismatch of phenyl contents.

The miscible pairs are designated by $m$ in the table below. These oils are commercially available from Dow Corning Corporation. The refractive indices ($n$, shown below) are proportional to their phenyl content.

| | Mole % Ph | DC 710 | DC 550 | DC 203 | DC 230 | DC 560 | DC 510 | DC 200 |
|---|---|---|---|---|---|---|---|---|
| DC 710 n=1.533 | 47 | m | m | | | | | |
| DC 550 n=1.4935 | 15 | m | m | | m | m | | |
| DC 203 alkyl—aryl n=1.4659 | — | | | | m | | | |
| DC 230 n=1.4615 | — | | m | | m | m | | |
| DC 560 chloro phenyl n=1.4360 | 16 | | m | | m | m | m | m |
| DC 510 n=1.425 | 2.6 | | | | | m | m | m |
| DC 200 all dimethyl n=1.4025 | 0 | | | | | m | m | m |

EXAMPLE 6

RTV 615 Part A (0% phenyl) and RTV 655 Part B (6% phenyl) were mixed together in a ratio of 10:1 by weight, respectively, and no filler. The mixture reacted to form an elastomeric mass but it was not transparent because the components were not sufficiently miscible. RTV 655 Part A (6% phenyl) and RTV 615 Part B (0% phenyl), were mixed together in a ratio of 10:1 by weight, respectively, and no filler. This mixture also cured to an elastomeric mass but was not transparent.

Poor miscibility was the result of poor matching of the phenyl contents of the respective polymers and caused the lack of transparency. Examples 5 and 6 indicate the importance of all liquid components of a silicone resin mixture having similar phenyl contents to have good miscibility and demonstrate the effect of miscibility on transparency.

In the main, silicone resins containing both phenyl and methyl groups in such proportions that the copolymer has a refractive index which matches that of a silica filler are used to obtain optically clear materials suitable for intraocular implants, lenses and, in particular, contact lenses.

I claim:
1. An optically clear, reenforced vulcanized silicone elastomer comprising 80 to 95% by weight of
   a. a copolymer comprising
      i. dimethyl siloxane,
      ii. diphenyl siloxane, or phenylmethyl siloxane or mixtures thereof, and
      iii. vinyl siloxane;
   b. a copolymer comprising
      i. dimethyl siloxane,
      ii. diphenyl siloxane or phenylmethyl siloxane or mixtures thereof, and
      iii. siloxane having $(R)_2HSiO$—or —O—SiH-R—O— groups, or both, wherein R is methyl or ethyl; with the proviso that each of fractions (a) and (b) has 6 to 16 mole percent phenyl and each contains no Part (iii) of the other;
   c. 5 to 20% of a silica filler, the refractive index of said copolymer being substantially the same as the index of refraction of (c).
2. An optically clear reenforced vulcanized silicone elastomer according to claim 1 wherein R is methyl, (c) is fume silica, group (b) (iii) is $R_2HSiO$— and the index of refraction of an elastomer of (a) and (b) is about 1.43 to 1.47.
3. An optically clear, reenforced vulcanized silicone elastomer according to claim 1, wherein there are 100 parts by weight of the copolymer (a) comprising about 0.3 mole percent of vinyl siloxane, 6 mole percent of diphenyl siloxane and the remainder being dimethyl siloxane; 10 parts by weight of copolymer (b) comprising 1 to 2 mole percent of —O—SiH $(CH_3)_2$ units, about 6 mole percent diphenyl siloxane, and the remainder being dimethyl siloxane, and about 11 parts by weight of fume silica filler.
4. A contact lens molded from the silicone elastomer as defined in claim 1.
5. An ocular implant molded from the silicone elastomer as defined in claim 1.
6. A contact lens molded from the silicone elastomer as defined in claim 3.

* * * * *